Feb. 16, 1932.  J. ZETSCHE ET AL  1,845,386
ELECTRIC MOTOR
Filed June 1, 1929

Jonny Zetsche
Nicolaus Petersen
James Sinclair-Ross
Toulmin & Toulmin

Patented Feb. 16, 1932

1,845,386

UNITED STATES PATENT OFFICE

JONNY ZETSCHE AND NICOLAUS PETERSEN, OF HAMBURG, GERMANY, AND JAMES SINCLAIR-ROSS, OF LONDON, ENGLAND; SAID PETERSEN ASSIGNOR TO SAID ZETSCHE AND SAID SINCLAIR-ROSS

ELECTRIC MOTOR

Application filed June 1, 1929, Serial No. 367,689, and in Germany June 8, 1928.

This invention relates to electric motors the stationary and moving elements of which are provided with separate coils and has for its object to provide an improved construction of electric motors of this kind.

Small high speed specially constructed electric motors have heretofore been employed, for driving gramophones for example, in which the motion has been transmitted to the axle of the disc or turntable either by means of a gearing, for example through a worm, or by a belt drive; in some cases also the motor is directly coupled with the said axle. It has been found however that owing to the high speed the motor bearings generally become quickly worn out and in the case of motors driven by alternating current irritating noises are thereby produced. Further in order to adapt the known motors for use in connection with all ordinary voltages a regulating resistance is required, and the drive is consequently expensive and is apt to produce disturbances in operation.

Electric motors for use with gramophones, for example, in which the stator and rotor are provided with separate coils mechanically wound, and therefore relatively cheap, are also known, but with these motors also various disadvantages have been found preventing their general introduction.

The improved construction of electric motors of the above indicated kind according to this invention may be applied both to small sizes of motors for driving light machinery, such as gramophones, and also to medium and large sizes for heavier work, and is characterized hereby, that the windings as a whole are adapted for connection to the maximum distribution voltage ordinarily met with and the stator and rotor coils are arranged to form two mutually complementary magnetic circuits of the horse-shoe type, the motor being adapted for connection to any lower supply voltage, or to run at various speeds with a given supply voltage, simply by changing the grouping of the separate coils without requiring any series resistance, so that the motor works, for example, as a two-pole, or four-pole, series-wound, shunt-wound, or compound-wound machines, and with alternating current can be run as a repulsion motor.

Figure 1:
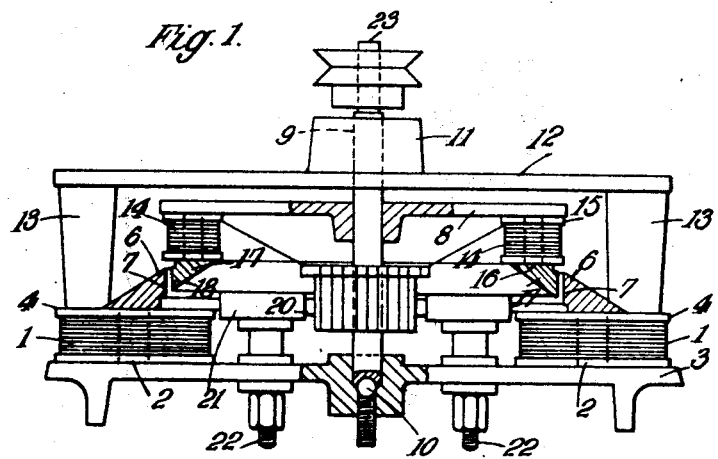
Figure 2:
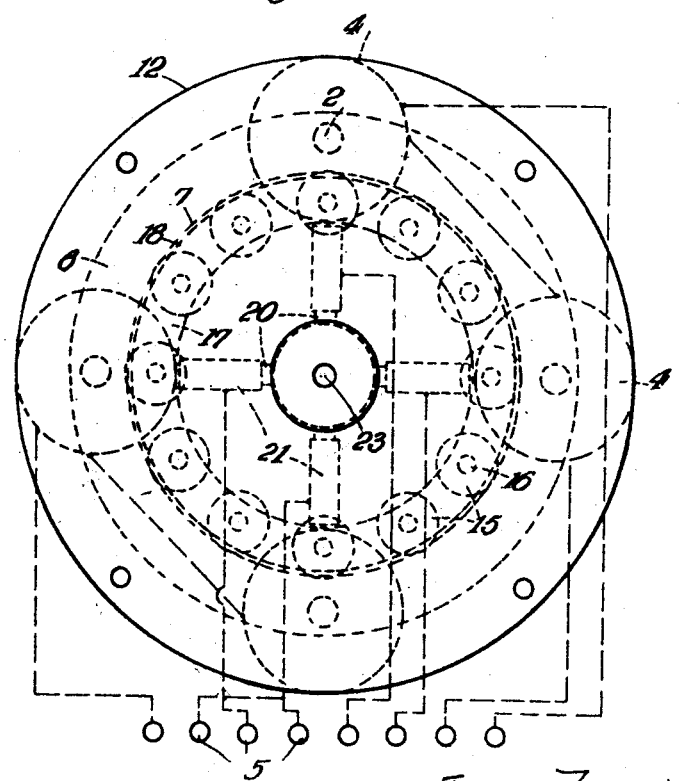

A form of the improved motor construction is illustrated as an example in the accompanying drawings in which Fig. 1 is a partly sectional side view;

Fig. 2 is a plan.

Referring to the drawings, the field winding consists, in the example shown, of four separate coils 1, the cores 2 of which are mounted upon the iron base plate 3 near the periphery of the same and equidistantly from one another. The coils 1 are helically wound on bobbins 4 and may be connected in pairs in parallel so as to produce alternately north and south poles, or they may be connected in series and so as to produce two or four field poles, the desired connections being effected by means of contacts 5 of a governing switch and one or more suitable moving contacts (not shown) co-operating therewith.

The lower ends of the cores 2 are preferably countersunk and in close connection with the iron base plate 3, while the upper ends of the cores are all interconnected by a closed iron ring 6. Thus all the lower ends of the field cores 2 are magnetically connected by the base plate 3 and all the upper ends of the said cores are magnetically connected by the ring 6, which preferably is of approximately triangular cross section with the inner side of the triangle forming a vertical wall as shown at 7.

The rotor consists of a member 8, which for example may be a disc, keyed upon the vertical spindle 9 which is adapted to rotate upon a step bearing 10 housed in the base plate 3, the upper part of the spindle 9 being supported in a central bearing 11 of a metal top plate 12 which is arranged parallel to the base plate 3 and rigidly secured thereto by bolts or the like 13.

The rotor disc 8 carries a number of coils 14 wound upon bobbins 15 and arranged equidistantly near the periphery of the disc, the cores 16 of the rotor coils being fixed at their upper ends to the underside of the disc 8. In the example illustrated twelve rotor coils 14 are shown, but any desired and convenient number may be provided. Thus the upper ends of the cores 16 are all magnetically interconnected by the iron disc 8, while the lower ends of the said cores are magnetically interconnected by a closed iron ring 17 formed with a vertical outer surface adapted to rotate in close proximity to the vertical surface 7 of the field ring 6 as indicated at 18.

The rotor coils, in the arrangement shown, are connected in series by a commutator 19 having the same number of segments as there are rotor coils. The beginning of each coil is connected to the appropriate segment of the commutator and the end of that coil is connected to the next following segment to which also the beginning of the next rotor coil is connected, and so on through the whole of the rotor coils. The commutator is carried by, and insulated from, the vertical spindle 9, while a set of four brushes 20 is provided, which brushes are contained in hollow cylindrical brush-holders 21 suitably supported upon and insulated from the base plate 3, the brushes 20 being acted upon by springs so as to continuously press upon the commutator 19. Current is supplied to the rotor through the terminals 22 which are in electrical connection with the brush holders 21 and thence with the brushes 20.

The upper end 23 of the vertical spindle 9 is provided with a pulley 24 which may be connected to the driven part by means of a suitable transmission belt.

The magnetic lines of force of the individual coils are perfectly combined by the closed iron rings in such a way that a uniform running free from disturbances is obtained. Even with alternating current of high frequencies the running of the motor is noiseless except for the usual slight humming inseparable from a rotor revolving at high speed.

It will of course be understood that the motor can be worked in any desired position and that the arrangement of the motor upon a horizontal base and with a vertical spindle is only selected for convenience of illustration and description.

What we claim and desire to secure by Letters Patent is:—

1. In an electric motor, in combination, a stator comprising a base plate of iron, a number of separate coils wound upon cores each with one end in magnetic contact with the base plate, a closed iron ring connecting the other ends of the stator cores, a rotor base member of iron supported so as to rotate in a plane parallel to that of the stator base plate, a plurality of separate coils wound upon cores each with one end in magnetic contact with the rotor base member, a closed iron ring connecting the other ends of the rotor cores arranged to rotate in close proximity to the corresponding stator ring, and means for supplying an electric current to the stator and rotor coils.

2. In an electric motor, the combination with a base plate of magnetic material, of a stator comprising a number of separate field coils mounted on said base plate, cores of said coils each with one end in magnetic contact with the base plate, a closed ring of magnetic material connecting together the other ends of the field cores, a rotatable shaft supported with its axis at right angles to the base plate, a rotor fixed upon said shaft comprising a disc of magnetic material, a plurality of separate coils mounted on the side of said disc adjacent the field coils and equi-distant from the axis of the shaft and from one another, cores of said rotor coils each with one end in magnetic contact with said disc, a closed ring of magnetic material connecting the other ends of the rotor cores and arranged to rotate in close proximity to the corresponding stator ring, and means for supplying an electric current to the stator and rotor coils.

3. In an electric motor, in combination, a stator element comprising an iron base plate, a number of separate coils thereon with cores arranged to form a magnetic circuit of the horse-shoe type, a rotor element comprising a shaft carrying an iron disc arranged to rotate in a plane parallel to the base plate, a number of separate coils on said disc with cores arranged to form a second magnetic circuit of the horse-shoe type complementary to the stator magnetic circuit, a closed pole-ring of iron connecting the ends of the stator cores remote from the base plate, a closed pole-ring of iron connecting the ends of the rotor cores adjacent the said stator pole-ring, and means for supplying an electric current to the stator and rotor coils.

4. In an electric motor, in combination, a stator element consisting of a number of separate coils wound upon cores in magnetic continuity with one another, a rotor element also consisting of a number of separate coils wound upon cores in magnetic continuity with one another, a closed iron ring fixed to and completing the magnetic circuit of the stator cores, and a closed iron ring fixed to and completing the magnetic circuit of the rotor cores and arranged to rotate in close proximity to the stator ring, and means for supplying an electric current to the stator and rotor coils.

5. In an electric motor, in combination, a stator element comprising an iron base and a number of separate coils wound upon iron cores united to the said base, a rotor element comprising an iron disc and a number of separate coils wound upon iron cores united to said disc and arranged so as to be magnetically complementary to the field of the stator element, an iron shunting member united to the stator cores so as to connect them all in a completely closed iron circuit, and an iron shunting member united to the rotor cores so as to connect them all in a second completely closed iron circuit and arranged to rotate in close proximity to said stator iron shunting member.

In testimony whereof, we affix our signatures.

JAMES SINCLAIR-ROSS.
JONNY ZETSCHE.

In testimony whereof, I affix my signature.

NICOLAUS PETERSEN.

CERTIFICATE OF CORRECTION.

Patent No. 1,845,386.                                    Granted February 16, 1932, to It is hereby certified that the name of the first named patentee in the above numbered patent was erroneously written and printed as "Jonny Zetsche", whereas said name should have been written and printed as Jonni Zetsche; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.